(12) United States Patent
Way

(10) Patent No.: US 7,092,642 B2
(45) Date of Patent: Aug. 15, 2006

(54) TUNABLE CHANNEL SPACING FOR WAVELENGTH DIVISION MULTIPLEXING (WDM) TRANSPORT SYSTEM

(75) Inventor: David G. Way, Garland, TX (US)

(73) Assignee: Fujitsu Limited, Kawasaki (JP)

( * ) Notice: Subject to any disclaimer, the term of this patent is extended or adjusted under 35 U.S.C. 154(b) by 954 days.

(21) Appl. No.: 09/923,862

(22) Filed: Aug. 6, 2001

(65) Prior Publication Data

US 2002/0021464 A1  Feb. 21, 2002

Related U.S. Application Data

(63) Continuation-in-part of application No. 09/633,005, filed on Aug. 4, 2000.

(51) Int. Cl.
*H04B 10/00* (2006.01)

(52) U.S. Cl. ............... 398/193; 398/196; 398/192

(58) Field of Classification Search ............ 398/9–17, 398/21, 173–181, 182–201
See application file for complete search history.

(56) References Cited

U.S. PATENT DOCUMENTS

| | | | |
|---|---|---|---|
| 5,202,782 A | 4/1993 | Nakamura et al. | 359/152 |
| 5,357,097 A | 10/1994 | Shiozawa et al. | 250/205 |
| 5,404,240 A | 4/1995 | Nishio et al. | 359/123 |
| 5,448,390 A | 9/1995 | Tsuchiya et al. | 359/132 |
| 5,566,018 A | 10/1996 | Lee et al. | 359/341 |
| 5,841,558 A | 11/1998 | Tamura et al. | 359/124 |
| 5,938,309 A | 8/1999 | Taylor | 357/124 |
| 5,943,149 A | 8/1999 | Cearns et al. | 359/124 |
| 5,949,563 A | 9/1999 | Takada | 359/124 |
| 6,014,237 A | 1/2000 | Abeles et al. | 359/124 |
| 6,014,366 A | 1/2000 | Ichiyoshi | 370/210 |
| 6,175,586 B1 | 1/2001 | Lomp | 375/130 |
| 6,181,450 B1 | 1/2001 | Dishman et al. | 359/124 |
| 6,400,477 B1 | 6/2002 | Wellbrook | 359/117 |
| 6,574,018 B1 | 6/2003 | Handelman | 359/124 |
| 6,810,215 B1 * | 10/2004 | Oikawa | 398/175 |
| 6,832,052 B1 * | 12/2004 | Marmur | 398/175 |

FOREIGN PATENT DOCUMENTS

| | | |
|---|---|---|
| EP | 0759 681 A2 | 2/1997 |
| WO | WO 00/34972 | 6/2000 |
| WO | WO 02/11341 A2 | 2/2002 |

OTHER PUBLICATIONS

Pieter W. Hooijmans, "Coherent Optical System Design," *John Wiley & Sons Ltd.*, 1994, 412 pages.

Tayebati et al., "Widely Tunable Fabry—Perot Filter Using Ga(Al)As—AlO$_x$ Deformable Mirrors," *IEEE Photonics Technology Letters*, vol. 10, No. 3, Mar. 1998, 4 pages.

Tayebati et al., "Microelectromechanical tunable filter with stable half symmetric cavity," *Electronics Letters*, vol. 34, No. 20, Oct. 1, 1998, 5 pages.

Ghatak et al., "Introduction to Fiber Optics," *Cambridge University Press* 1998, 577 pages.

Gerard Lachs, "Fiber Optic Communications Systems, Analysis, and Enhancements," *McGraw-Hill*, 1998, 401 pages.

(Continued)

*Primary Examiner*—Agustin Bello
(74) *Attorney, Agent, or Firm*—Baker Botts L.L.P.

(57) ABSTRACT

A method and system for tuning channel spacing for a wavelength division multiplexing (WDM) transport system includes determining a spectrum width for a channel. A bandwidth of a group of base channels covering the spectrum width for the channel is allocated to the channel. A passband of a channel filter at a center frequency of the group is adjusted to correspond to the spectrum width of the channel.

23 Claims, 6 Drawing Sheets

OTHER PUBLICATIONS

Harold Kolimbiris, "Digital Communications Systems With Satellite and Fiber Optics Applications," *Prentice-Hall, Inc.*, 2000, 481 pages.

J. Roldán et al., "New Algorithm for Management of the Optical Spectrum in Multiwavelength Optical Networks," *Integrated Optoelectronics*, 1994, Proceedings of IEE/LEOS Summer Topical Meetings, 2 pages.

International Search Report in International Application No. PCT/US 01/41598, dated Jun. 21, 2002, 7 pages.

International Search Report in International Application No. PCT/US 01/41598, dated Nov. 4, 2002, 6 pages.

* cited by examiner

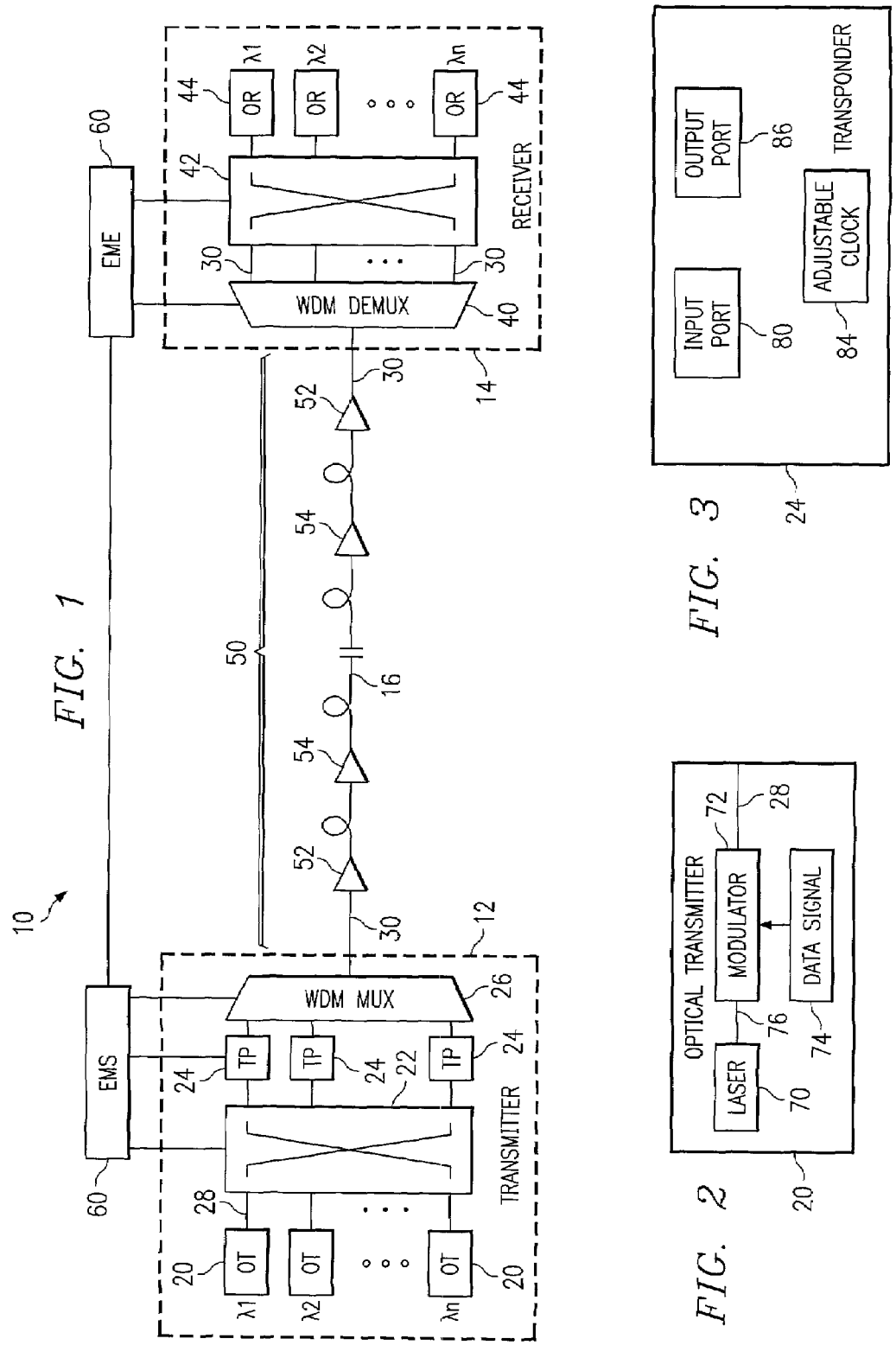

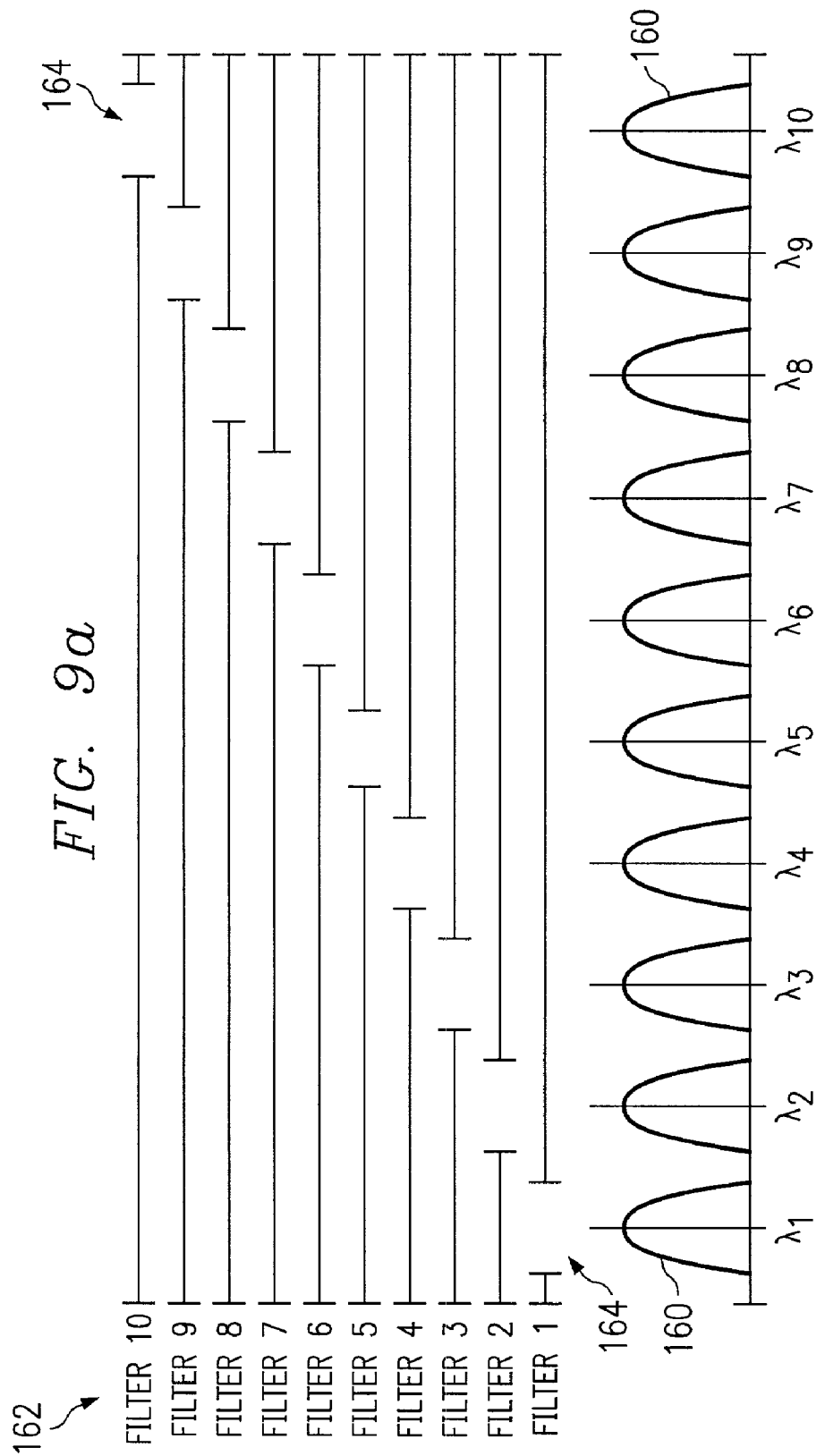

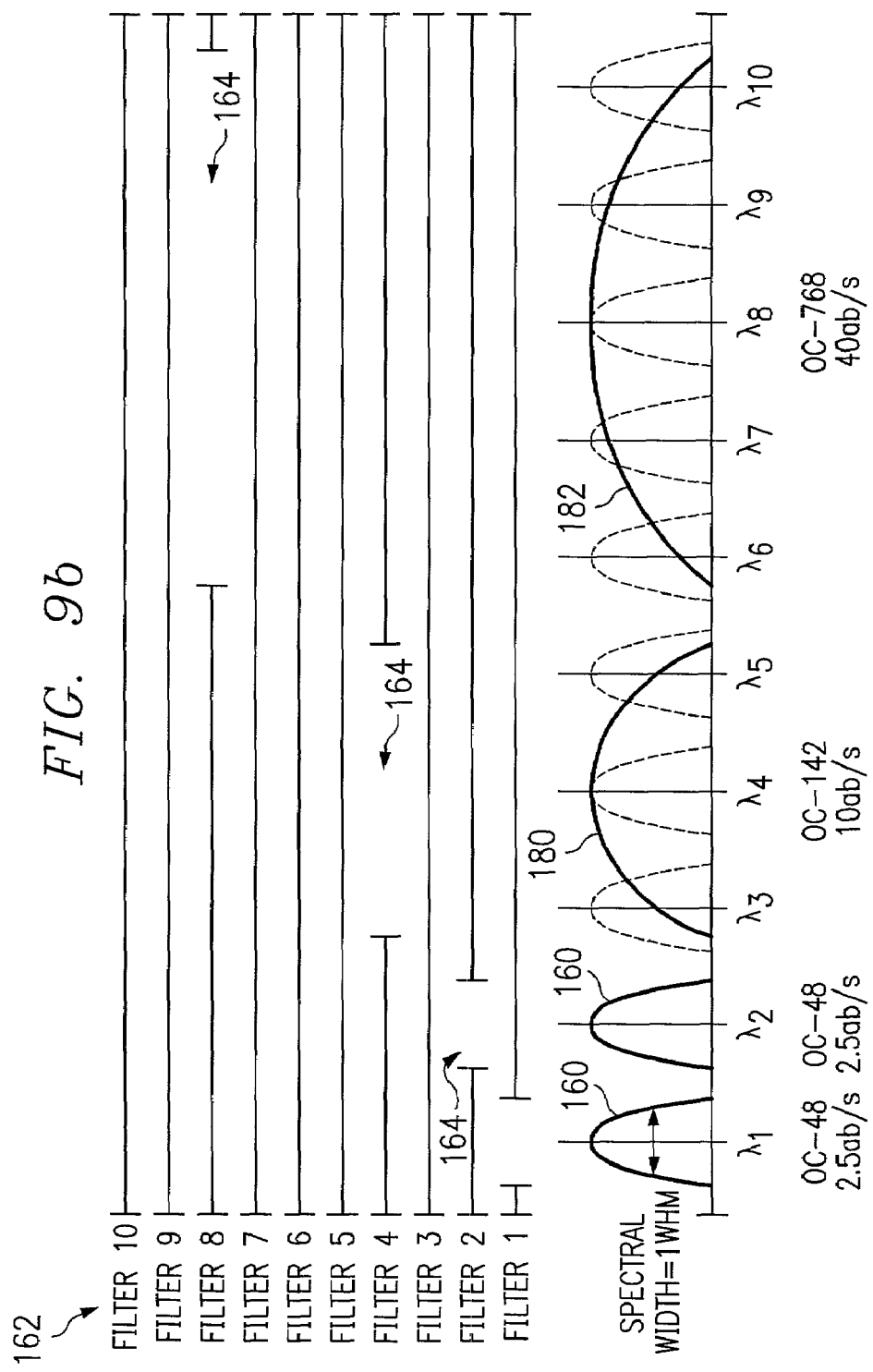

TUNABLE CHANNEL SPACING FOR WAVELENGTH DIVISION MULTIPLEXING (WDM) TRANSPORT SYSTEM

CROSS REFERENCE TO RELATED APPLICATION

This application is a continuation-in-part of U.S. application Ser. No. 09/633,005, filed Aug. 4, 2000, by David G. Way and entitled "Transport System with Tunable Channel Spacing DWDM".

TECHNICAL FIELD OF THE INVENTION

The present invention relates generally to optical transport systems, and more particularly to a method and system for tuning channel spacing for a wavelength division multiplexing (WDM) transport system.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) to increase transmission capacity. In a WDM network, a number of optical channels are carried in each fiber at disparate wavelengths. Network capacity is based on the number of wavelengths, or channels, in each fiber and the bandwidth, or size of the channels.

The optical channels may be one or more of OC-48 channels having a frequency bandwidth of 50 gigahertz (GHz), OC-192 channels having a frequency bandwidth of 100 GHz, OC-768 channels having a frequency bandwidth of 200 GHz, and the like. The channels are each data modulated, frequency adjusted and/or filtered based on a fixed bandwidth and a specified frequency. The utilization of transmission resources in each channel varies over time depending on channel data rates. Unused channel capacity is wasted and limits traffic that can be carried by the network.

SUMMARY OF THE INVENTION

The present invention provides a method and system of tuning channel spacing for wavelength division multiplexing (WDM) and other multi-channel optical transport systems that substantially eliminate or reduce the problems and disadvantages associated with previous systems and methods. In a particular embodiment, channel spacing is tuned based on current and/or projected resource use to increase bandwidth utilization in each channel and traffic density of the system.

In accordance with one embodiment of the present invention, a method and system for tuning channel spacing for a wavelength division multiplexing (WDM) transport system includes determining a spectrum width for a channel. A bandwidth of a group of discretable base channels covering the spectrum width for the channel is allocated to the channel. A passband of a channel filter at a center frequency of the group is adjusted to correspond to the spectrum width for the channel.

More specifically, in accordance with a particular embodiment of the present invention, a bit rate may be received for a data flow to be transported by the channel and the spectrum width determined for the channel based on the bit rate. In this and other embodiments, a plurality of non center frequency filters in the spectrum widths of the channel may be deactivated. A transponder may be set to convert an optical signal for the channel from an initial center frequency to the center frequency of the channel. In addition, a clock source of the transponder may be set based on the bit rate of the channel.

In accordance with another aspect of the present invention, a WDM multiplexer may include a filter array and a combiner. The filter array includes a plurality of filters each having a disparate center frequency and an adjustable spectrum width operable to filter a mixed bandwidth channel. The combiner is operable to combine into a WDM signal a plurality of mixed bandwidth channels passing through the filters of the filter array.

In accordance with still another aspect of the present invention, a WDM demultiplexer includes a splitter and a filter array. The splitter is operable to separate a WDM signal into a plurality of mixed bandwidth channels. The filter array includes a plurality of filters each including a disparate center frequency and an adjustable spectral bandwidth operable to filter a mixed bandwidth channel.

Technical advantages of the present invention include providing a method and system of tuning channel spacing for WDM and other multi-channel optical transport systems. In a particular embodiment, channel spacing is tuned for each channel to match resource allocation to current and/or projected resource requirements. As a result, the efficiency of each channel is increased and the number of channels and/or data that may be transported by the transport system is increased.

Another technical advantage of the present invention includes providing an improved optical transport system. In a particular embodiment, the optical transport system supports mixed bit rate signals and may dynamically adjust channel spacing to account for varying bit rates of the signals. In this way, the entire working bandwidth of the transport system may be efficiently utilized.

Still another technical advantage of the present invention includes providing an improved WDM multiplexer and WDM demultiplexer. In a particular embodiment, tunable filters are used in the WDM multiplexer and the WDM demultiplexer to vary the spectrum width of the channels, and thus the channel spacing. Because the width of channel spacings is variable, different amounts of data may be modulated onto a signal within a given channel, and a bandwidth allocated to the channel can be dynamically changed to accommodate an increase or a decrease in bit rate. This allows for the most efficient use of the system by allocating narrow bandwidth channels to low bit rate signals and wider bandwidth channels to higher bit rate signals.

Still another technical advantage of the present invention includes providing an improved transponder for WDM systems. In a particular embodiment, the transponder is a bit-to-bit transponder with wavelength conversion capability and includes selectable clock sources to support mixed bit rate channels. Thus, the transponder may be used in connection with different channels having different bit rates and may be dynamically adjusted to support a single channel with a changing bit rate.

It will be understood that the various embodiments of the present invention may include some, all, or none of the enumerated technical advantages. In addition, other technical advantages of the present invention may be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 1 is a block diagram illustrating a wavelength division multiplexing (WDM) transport system with tunable channel spacing in accordance with one embodiment of the present invention;

FIG. 2 is a block diagram illustrating details of the optical transmitter of FIG. 1 in accordance with one embodiment of the present invention;

FIG. 3 is a block diagram illustrating details of the transponder of FIG. 1 in accordance with one embodiment of the present invention;

FIGS. 9A–B illustrate base and combined channels for the WDM transport system of FIG. 1 in accordance with one embodiment of the present invention.

DETAILED DESCRIPTION OF THE INVENTION

Figure 4:
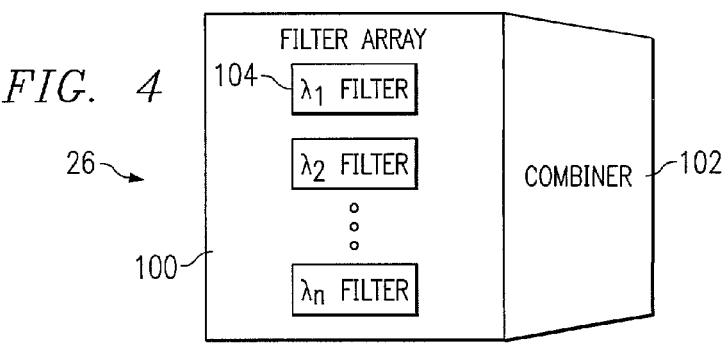
FIG. 4 is a block diagram illustrating details of the WDM multiplexer of FIG. 1 in accordance with one embodiment of the present invention.

FIG. 1 illustrates an optical transport system 10 in accordance with one embodiment of the present invention. In this embodiment, the optical transport system 10 is a wavelength division multiplexing (WDM) system in which a number of optical channels are carried over a common path at disparate wavelengths. The WDM system 10 may comprise a dense WDM (DWDM) and other suitable multi-channel transport system. The optical transport system 10 may be used in a short-haul metropolitan network, a long-haul intercity network or any other suitable network or combination of networks.

Referring to FIG. 1, the WDM system 10 includes a WDM transmitter 12 at a source end point and a WDM receiver 14 at a destination end point coupled together by an optical link 16. The WDM transmitter 12 transmits data in a plurality of optical signals, or channels, over the optical link 16 to the remotely located WDM receiver 14. As described in more detail below, the spectrum width, or spacing, of the channels may be dynamically tuned to optimize transport efficiency in the channels and to maximize traffic density in the system 10.

The WDM transmitter 12 includes a plurality of optical transmitters 20, a plurality of transponders 22, a cross connect 24 and a WDM multiplexer 26. Each optical transmitter 20 generates an optical information signal 28 on one of a set of distinct wavelengths $\lambda_1, \lambda_2 \ldots \lambda_n$ at the minimum channel spacing. The optical information signals 28 comprise optical signals with at least one characteristic modulated to encode audio, video, textual, real-time, non-real-time or other suitable data.

The distinct wavelengths at the minimum channel spacing each form a base channel that can independently transport traffic for a flow or that can be grouped into a larger combined channel to transport traffic for a higher bit rate flow. In one embodiment, the minimum channel spacing, or granularity, may be selected to coincide with the lowest bit rate of data flows transported by the system 10 in order to maximize system flexibility. It will be understood that minimal channel spacing granularity may be suitably varied without departing from the scope of the present invention. For example, the base channels may have disparate bandwidths.

In one embodiment, the distinct wavelengths, or lambdas, are centered around a wavelength of 1,550 nanometers (nm), and have about a 32 nm wide total band. In this embodiment, the center frequencies of the lambdas range from 1530 nm to 1562 nm with discrete center frequencies at a spacing selected to avoid or minimize cross talk. This translates into a frequency domain of about 4000 gigahertz (GHz) of bandwidth. For minimal channel spacings of 50 GHz or about 0.4 nm of line width, about 80 discrete channels may exist on the fiber 16. It will be understood that the minimal channel spacing and usable wavelengths for transmissions may be suitably varied. For example, the wavelengths may range from 1310 nm to 1650 nm to allow a larger number of base channels.

The cross connect 22 allows one or more optical signals generated by the optical transmitters 20 to be connected to one or more of the transponders 24 for conversion to a particular wavelength and multiplexing into a WDM signal for transmission over the system 10. It will be understood that optical signals may be patched, coupled or otherwise suitably connected to the transponders 24 and/or the WDM multiplexer 26 without departing from the scope of the present invention.

The transponders 24 are each operable to perform wavelength conversion for a received optical signal. Wavelength conversion converts the optical signal from a first center frequency to a second center frequency for filtering and multiplexing in the WDM multiplexer 26. As used herein, each means everyone of at least a subset of the identified items.

The transponders 24 may have selectable clock sources to provide wavelength conversion for a mixed bandwidth channel. In particular, a clock source may be selected to match the incoming signal bit rate. A mixed bandwidth channel is a received flow having disparate bandwidths, or bit rates, at disparate times and may comprise a single channel with dynamically changing bandwidth or a plurality of channels received at different times and having different bandwidths. The transponders 24 may be bit-to-bit transponders operable to provide wavelength conversion independent of the optical signal format.

The WDM multiplexer 26 multiplexes the optical information signals 28 into a single WDM signal 30 for transmission on the optical link 16. The WDM signal may be transmitted in the synchronous optical network (SONET), frame relay, asynchronous transport mode (ATM), Internet protocol (IP) or other suitable format.

The WDM receiver 14 receives, separates and decodes the optical information signals 28 to recover the included data. In one embodiment, the WDM receiver 14 includes a WDM demultiplexer 40, a cross connect 42 and a plurality of optical receivers 44.

The WDM demultiplexer 40 demultiplexes the optical information signals 28 from the single WDM signal 30 and sends each optical information signal 28 to a corresponding optical receiver 44 through the cross connect 42. Each optical receiver 44 optically or electrically recovers the encoded data from the corresponding signal 28.

Although the transmitter 12 and the receiver 14 are each illustrated as including a cross-connect, it will be understood that the transmitter 12 and/or receiver 14 may omit the cross connect. In such an embodiment, the optical transmitters 20 of the transmitter 12 may be directly connected to the transponders 24 and/or the WDM multiplexer 26. The optical receivers 44 of the receiver 14 may be directly connected to the WDM demultiplexer 40. Alternatively, optical signals may be manually or otherwise suitably patched between the optical transmitters 20 and WDM multiplexer 26 and/or the WDM demultiplexer 40 and the optical receivers 44.

In another embodiment, for example when the transmitter is at a switching node in the network and receives rather than generates the optical signals, the transponders 24 may be omitted and the received signals connected to corresponding frequency ports of the WDM multiplexer 26 through the cross connect 22. Locally generated signals may be similarly connected. In still another embodiment, tunable or other suitable emitters may be used in the optical transmitters 20 and the optical transmitters 20 directly connected to the corresponding filter port or ports of the WDM multiplexer 26. It will be understood that the transmitter 12 may comprise any suitable configuration in which a received and/or generated optical signal is connected to corresponding frequency port of the WDM multiplexer 26. The receiver 14 may comprise any suitable configuration in which a received and demultiplexed optical signal is connected to a corresponding optical receiver.

The optical link 16 comprises optical fiber or other suitable medium in which optical signals may be transmitted with low loss. Interposed along the optical link 16 are one or more optical amplifiers 50. The optical amplifiers 50 increase the strength, or boost, one or more of the optical information signals 28, and thus the WDM signal 30, without the need for optical-to-electrical conversion.

In one embodiment, the optical amplifiers 50 comprise discrete amplifiers 52 and distributed amplifiers 54. The discrete amplifiers 52 may comprise rare earth doped fiber amplifiers, such as erbium doped fiber amplifiers (EDFAs), and other suitable amplifiers operable to amplify the WDM signal 30 at a point in the optical link 16. The distributed amplifiers 54 amplify the WDM signal 30 along an extended length of the optical link 16. In one embodiment, the distributed amplifiers 54 may comprise distributed Raman amplifiers (DRA).

An element management system (EMS) 60 manages the transmitter 12, receiver 14 and other elements of the WDM system 10. In one embodiment, the element management system 60 controls connections of the cross connect 22, the frequency and selected source clock of the transponders 24 and the spectrum width, or passband of the filters in the WDM multiplexer 26 of the receiver 12 as well as the passband in the corresponding filters of the WDM demultiplexer 40 of the receiver 14 to dynamically tune channel spacing and maximize traffic density. Tuning may be dynamic in that the bandwidth of a channel is readily configurable using standard provisioning commands during system operation. The tuning may be across all affected elements of system 10 and be accomplished in one or a minimal number of clock cycles.

The element management system 60 may comprise hardware and/or software logic encoded in media for carrying out functional instructions. In one embodiment, the element management system 60 may provision the transport channels to include one or more of the base channels in real time, during maintenance periods or as requested using currently inactive channels. In the latter embodiment, the element management system 60 may assign working channels to adjacent base channels in order to maximize the number of inactive base channels that can be grouped into a larger working channel.

The tunable channel spacing of the WDM system allows, in one embodiment, the bandwidth of each channel to be varied so that a low bit rate channel space may be combined with adjacent channel space to form a higher bit rate channel space. Likewise, higher bit rate channel spaces may be divided into smaller bit rate channel spaces. Tuning the channel bandwidths allows each channel to accommodate lower or higher bit rates signals as necessary for optimum total system bandwidth usage.

FIG. 2 illustrates details of the optical transmitter 20 in accordance with one embodiment of the present invention. In this embodiment, the optical transmitter 20 comprises an emitter, or laser 70, a modulator 72 and a data signal 74. The laser 70 generates a carrier signal at a prescribed or selected frequency with good wavelength control.

The modulator 72 modulates the carrier signal with the data signal 74 to generate the optical information signal 28. As the bit rate of data modulated onto a channel carrier signal increases, a bandwidth requirement for the channel also increases. For example, a 2.5 gigabit per second (Gb/s) data stream typically occupies a 50 GHz channel space, while a 5 Gb/s data stream occupies a 100 GHz channel space.

The modulator 72 may employ amplitude modulation, frequency modulation, phase modulation, intensity modulation, amplitude-shift keying, frequency-shift keying, phase-shift keying and/or other suitable techniques for encoding the data signal 74 onto the carrier signal. In a particular embodiment, the modulator 72 may comprise a Mach-Zender interferometer.

In one embodiment, each modulator 72 may modulate data at a rate up to the highest channel bit rate supported by the WDM system 10. This may maximize flexibility in the transmitter 12 by allowing any optical transmitter 20 to modulate any incoming data signal 74. Alternatively, a subset of the optical transmitters 20 may have a high rate modulator 72 to handle high bit rate signals 74 while the remaining optical transmitters 20 have lower rate modulators 72 to handle lower rate data signals 74. In this and other embodiments, the element management system 60 may select to optical transmitter 20 for a channel.

FIG. 3 illustrates details of the transponder 24 in accordance with one embodiment of the present invention. In this embodiment, the transponder 24 is a bit-to-bit transponder and includes an input port 80, an adjustable, or selectable, clock 84 and an output port 86. The bit-to-bit transponder 24 with the selectable clock sources 84 allows, in one embodiment, wavelength conversion for mixed bandwidth channels of the WDM system 10.

Referring to FIG. 3, the input port 80 receives an optical signal 28 at an initial, or first center frequency. The optical signal 28 may be generated by the optical transmitter 20 or received from a transmission line. The optical signal 28 is passed into the transponder where the wavelength of the received optical signal 28 is converted from the first center frequency to a second center frequency at a rate matching or otherwise corresponding to the bit rate of the data flow. The adjustable clock 84 may be set by the element management system 60. The frequency adjusted optical signal is forwarded to the output port 86 and from there to the WDM multiplexer 26 for multiplexing into the WDM signal 30.

FIG. 4 illustrates details of the WDM multiplexer 26 in accordance with one embodiment of the present invention. In this embodiment, the WDM multiplexer 26 includes a filter array 100 and a combiner 102. The combiner 102 combines the filtered optical signals 28 into the WDM signal 30 for transmission over the optical link 16.

The filter array 100 includes a plurality of tunable filters 104 each having a center frequency at one of the discrete wavelengths, or lambdas, of the base channels and an adjustable passband. In one embodiment, the tunable filters 104 are selected to have a minimum passband corresponding to the spectrum width of the base channels. The tunable passband of the channel allows the bandwidth of each channel to be varied such that a low bit rate channel may be combined with adjacent bandwidth channels to form a higher bit rate channel.

Figure 5:
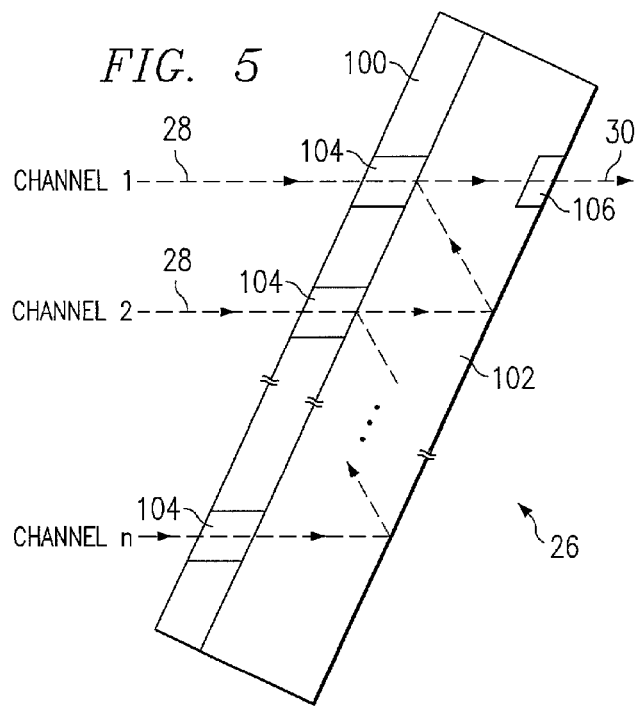
FIG. 5 illustrates details of the filter array and the combiner of the WDM multiplexer of FIG. 4 in accordance with one embodiment of the present invention.

FIG. 5 illustrates details of the filter array 100 and the combiner 102 of the WDM multiplexer 26 in accordance with a particular embodiment of the present invention. In this embodiment, the tunable filters 104 may comprise Fujitsu's acoustic optical tunable filter (AOTF), TI's digital light processor (DLP) filter or other suitable filter such as a micromachined tunable filter based on distributed brag reflectors (DBR) and micro mechanically tunable Fabry-Perot etalon devices using quarter wave stack mirrors capable of producing line widths of 0.3 nm or less with free spectrum ranges of more than 70 nm and insertion loss of less than 1 dB.

Referring to FIG. 5, each optical signal 28 is filtered based on passband of the corresponding filter 104. The filtered signals are reflected multiple times within the combiner 102 to form the WDM signal 30 which is incident on the output port 106 and coupled to the optical fiber 16.

Figure 6:
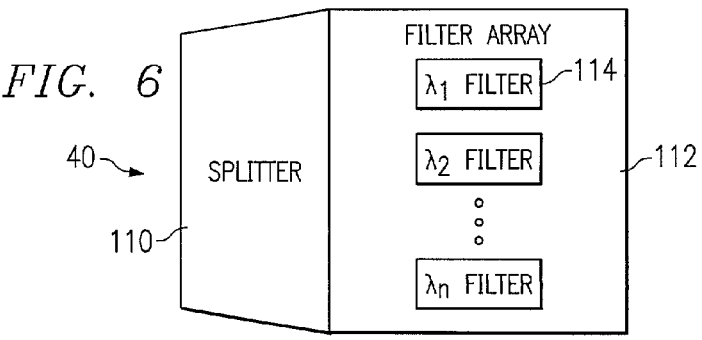
FIG. 6 is a block diagram illustrating details of the WDM demultiplexer of FIG. 1 in accordance with one embodiment of the present invention.

FIG. 6 illustrates details of the WDM demultiplexer 40 in accordance with one embodiment of the present invention. In this embodiment, the WDM demultiplexer 40 includes a splitter 110 and a filter array 112. The splitter 110 receives the WDM signal 30 and separates it into the discrete optical signals 28.

The filter array 112 includes a plurality of tunable filters 114. The tunable filters 114 each have a center frequency at one of the discrete wavelengths, or lambdas, of the base channels and an adjustable passband. In one embodiment, the tunable filters 114 are selected to have an adjustable passband corresponding to the transmit filters in the WDM multiplexer 26. The tunable filters 104 and 114 as well as any other filters for each channel are each tuned by the element management system 60 to a same passband corresponding to the spectrum width of the channel.

Figure 7:
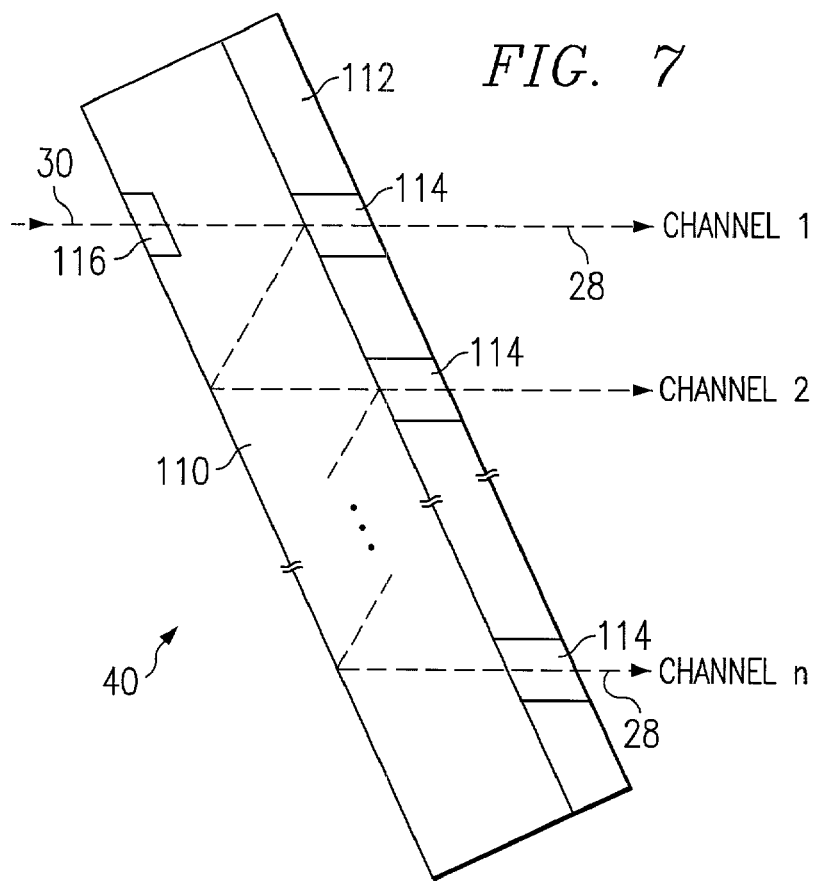
FIG. 7 illustrates details of the splitter and the filter array of the WDM demultiplexer of FIG. 6 in accordance with one embodiment of the present invention.

FIG. 7 illustrates details of the splitter 110 and the filter array 112 of the WDM demultiplexer 40 in accordance with a particular embodiment of the present invention. In this embodiment, the WDM signal 30 enters an input port 116 of the splitter 110 and reflects multiple times within the splitter 110 to be incident on each filter 114 of the filter array 112.

The adjustable filters 114 may each be a Fujitsu OATF or other suitable filter as described in connection with filters 104.

Each filter 114 filters out an optical signal 28 based on its center frequency and spectrum width. For each channel, the spectrum width of the corresponding filters 104 and 114 in the WDM multiplexer and demultiplexer 22 and 30 are tuned to the same spectrum width. The filters may be tuned dynamically in real time, during maintenance cycles or during channel setup.

Figure 8:
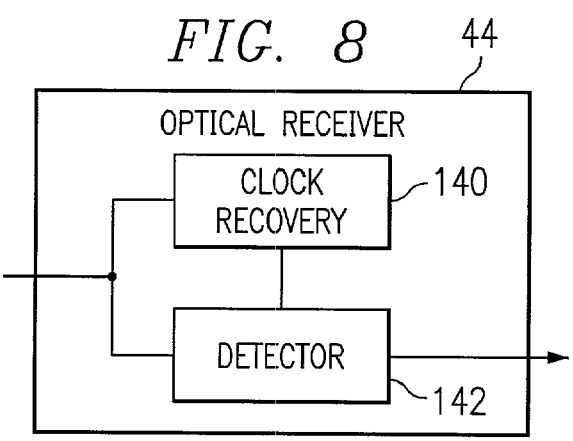
FIG. 8 is a block diagram illustrating details of the optical receiver of FIG. 1 in accordance with one embodiment of the present invention.

FIG. 8 illustrates details of the optical receiver 44 in accordance with one embodiment of the present invention. In this embodiment, the optical receiver 144 includes clock recovery 140 and detector 142.

The clock recovery 140 recovers the clock signal from the optical signal 28 and passes the clock signal to detector 142. Detector 142 recovers and outputs the data signal. In one embodiment, the optical receivers 44 are each operable to detect and recover data at all bit rates supported by the WDM system 10. In another embodiment, a subset of the optical receivers 44 may be operable to recover data at high bit rates while the remaining optical receivers 44 are operable to recover data at lower and/or base channel rates. In this embodiment, the element management system 60 may select an optical receiver 44 in provisioning the channel.

FIGS. 9A–B illustrate the base channels and combined channels of the WDM system 10 in accordance with one embodiment of the present invention. In this exemplary embodiment, the WDM system 10 includes 10 OC-48 base channels each operable to transport 2.5 Gb/s and having a 50 GHz spacing. The combined channels may be OC-192, OC-768 and other suitable groupings of the base channels. The OC-192 channel is operable to transport 10 Gb/s and has a channel spacing of 150 GHz. The OC-768 channel is operable to transport 40 Gb/s and has a channel spacing of 250 GHz.

Referring to FIG. 9A, the horizontal axis illustrates base channels 160 ($\lambda_1$–$\lambda_{10}$). The vertical axis illustrates the passband of the adjustable filters 162 (1–10) of the filter array 100 in the WDM multiplexer 22. As previously described, for each channel, the adjustable filter 114 of the WDM demultiplexer 40 has the same passband as the corresponding filter 104 in the WDM multiplexer 22.

When each base channel 160 is in use, the filters 162 are tuned to narrow passbands 164. Thus, each filter 162 has a passband 164 corresponding to the spectrum width of the base channel 160 and creates a low bit rate channel space passing a disparate frequency band. In this configuration, the number of transport channels, and thus subscribers is maximized.

Referring to FIG. 9B, base channels $\lambda_3$–$\lambda_5$ are grouped into a combined OC-192 channel 180 having a higher bit rate and wider spectrum. OC-192 channel 180 has a center frequency of $\lambda_4$. Similarly, base channels $\lambda_6$–$\lambda_{10}$ are grouped into a combined in an OC-786 channel 182 having a bandwidth of 40 Gb/s and a spectrum width of 250 GHz.

To accommodate the combined channels, filter 4 having center frequency of $\lambda_4$ is tuned to widen the passband to 150 GHz. Similarly, filter 8 corresponding to $\lambda_8$ is tuned to a passband of 250 GHz to pass the OC-768 channel. The filters 104, optical transmitters 20 and/or transponders 24 for the unused base channels $\lambda_3$, $\lambda_5$, $\lambda_6$–$\lambda_7$, and $\lambda_9$–$\lambda_{10}$ are turned off, closed or otherwise deactivated. In this way, the WDM system 10 is operable to transport mixed bit rate channels and to provide higher bit rate channels tuned to a carrier's particular need by combining lower bit rate channel spaces into a higher bit rate channel space and dividing a higher bit rate channel space into several low bit channel spaces.

Figure 10:
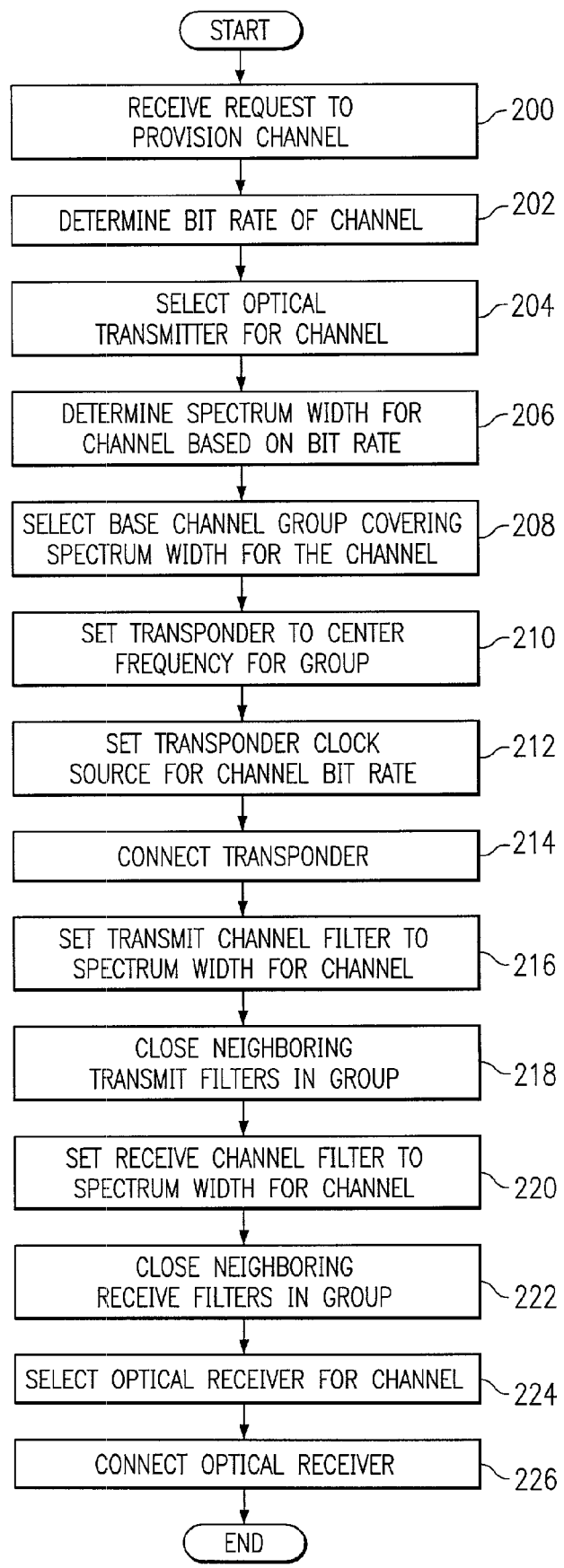
FIG. 10 is a flow diagram illustrating a method for tuning channel spacing for a WDM transport system in accordance with one embodiment of the present invention.

FIG. 10 illustrates a method for tuning channel spacing for a WDM transport signal in accordance with one embodiment of the present invention. In this embodiment, a transmitter includes a optical transmitter, cross connect, transponders and a WDM multiplexer as described in connection with FIG. 1. The receiver includes a WDM demultiplexer and optical receiver as also described in connection with FIG. 1. It will be understood that the method of the present invention may be used independently of the transponders, cross connects and/or other elements of the transponder, receiver, or WDM system 10.

Referring to FIG. 10, the method begins at step 200 in which a request to provision a channel is received. The request may be part of channel set up or a dynamic modification to the channel.

Next, at step 202, a bit rate of the channel is determined for the data flow to be transported by the channel. At step 204, an optical transmitter 20 is selected for the channel. The optical transmitter may be selected based on the capacity of the modulator 72, and the bit rate of the data flow and/or the frequency of the channel.

Proceeding to step 206, a spectrum width is determined for the channel based on the bit rate. The spectrum width may be a nanometer range, a number of base channels, spectral coverage and/or other suitable information from which a number of base channels for the channel can be determined. As previously described, the spectrum width for a channel increases as the bit rate requirement increases. For example, a 10 Gb/s channel may have a 150 GHz spectrum width and a 40 Gb/s channel a 250 GHz spectrum width.

At step 208, a group, or set, of base channels covering the spectrum width for the channel is selected to form a single combined channel. In one embodiment, an odd number of base channels are selected for inclusion in the combined channel such that the center frequency of the combined channel is a standard frequency, or lambda. If the combined channel has a non standard center frequency, the filters are accordingly adjusted.

At step 210, a transponder 24 for the optical transmitter 20 is set to the center frequency for the combined channel. At step 212, the clock source for the transponder 24 is selected to match to the bit rate of the data signal for the channel.

Proceeding to step 214, the transponder 24 output is connected to the filter 104 of the filter array 102 corresponding to the center frequency of the channel. At step 216, the passband of the filter is set to the spectrum width of the channel. The filters for non-centered base channels in the combined channel are closed at step 218.

At step 220, the passband for the corresponding receiver filter 114 is set to match the spectrum width of the channel and the passband transmit filter 104. At step 222, non-centered receive filters in the WDM demultiplexer 40 neighboring the center frequency filter and included in the combined channel are closed.

At step 224, an optical receiver 44 operable to detect and recover the data signal is selected for the channel. At step 226, the output from the center frequency filter of the WDM demultiplexer 40 is connected to the optical receiver 44. Step 226 leads to the end of the process by which a combined channel including a plurality of base channels is provisioned to handle a high bit rate data flow. It will be understood that any intermediate filters for the channel in the WDM system 10 are likewise set to the spectrum width.

Although the present invention has been described with several embodiments, various changes and modifications may be suggested to one skilled in the art. It is intended that the present invention encompass such changes and modifications as fall within the scope of the appended claims.

What is claimed is:

1. A wavelength division multiplexing (WDM) transmitter system, comprising:
   a plurality of optical transmitters;
   a filter array including a plurality of filters, the filters each connectable to an associated optical transmitter and having a disparate center frequency and a spectrum width dynamically adjustable to correspond to a bandwidth of an optical signal generated by the associated optical transmitter;
   a combiner operable to combine into a wavelength division multiplexing (WDM) signal a plurality of the optical signals generated by the optical transmitters and passing through the filters of the filter array;
   a plurality of transponders, the transponders each connectable to an associated optical transmitter and operable to adjust a center frequency of a received optical signal to generate a frequency adjusted optical signal and to provide the frequency adjusted optical signal to a connected filter of the filter array; and
   wherein each of the transponders is directly connected to the associated optical transmitter, further comprising a cross-connect operable to connect at least a subset of the transponders to at least a subset of the filters of the filter array.

2. The WDM transmitter system of claim 1, wherein at least two of the optical transmitters comprise disparate rate modulators.

3. The WDM transmitter system of claim 1, wherein at least one of the optical transmitters is operable to modulate data for a mixed bandwidth channel.

4. The WDM transmitter system of claim 1, further comprising a cross-connect operable to connect at least a subset of the optical transmitters to at least a subset of the filters in the filter array.

5. The WDM transmitter system of claim 1, further comprising at least one transponder, the transponder operable to receive from a connected optical transmitter an optical signal having a center frequency, to generate a frequency adjusted optical signal having a disparate center frequency and to provide the frequency adjusted optical signal to a connected filter of the filter array.

6. The WDM transmitter system of claim 1, the cross-connect further operable to connect any one of the transponders to any one of the filters of the filter array.

7. The WDM transmitter system of claim 1, wherein each of the transponders comprises a bit-to-bit transponder operable to provide wavelength conversion for the received optical signal.

8. The WDM transmitter system of claim 7, wherein each of the transponders comprises selectable clock sources to match an incoming bit rate of the received optical signal.

9. The WDM transmitter system of claim 1, further comprising a controller comprising logic encoded in media, the controller operable to determine a bandwidth for a channel, to select and connect an optical transmitter and a filter for the channel and to dynamically adjust the spectrum width of the filter to correspond to the bandwidth of the channel.

10. The WDM transmitter system of claim 9, the controller further operable to select the optical transmitter based on the bandwidth of the channel.

11. The WDM transmitter system of claim 9, the controller further operable to deactivate filters neighboring the filter of the channel that are within the spectrum width of the channel.

12. A method for provisioning a wavelength division multiplexing (WDM) transmitter system, comprising:
   connecting to each of a plurality of optical transmitters a respective filter of a filter array comprising a plurality of filters, the filters each having a disparate center frequency and a spectrum width dynamically adjustable to correspond to a bandwidth of an optical signal generated by the associated optical transmitter;
   combining into a wavelength division multiplexing (WDM) signal a plurality of the optical signals generated by the optical transmitters and passing through the filters of the filter array;
   directly connecting each of a plurality of transponders to an associated optical transmitter and adjusting a center frequency of a received optical signal to generate a frequency adjusted optical signal and to provide the frequency adjusted optical signal to a connected filter of the filter array; and
   connecting at least a subset of the transponders to at least a subset of the filters of the filter array using a cross-connect.

13. The method of claim 12, wherein at least two of the optical transmitters comprise disparate rate modulators.

14. The method of claim 12, further comprising modulating data for a mixed bandwidth channel using at least one of the optical transmitters.

15. The method of claim 12, further comprising connecting at least a subset of the optical transmitters to at least a subset of the filters in the filter array using a cross-connect.

16. The method of claim 12, further comprising:
   receiving, using at least one transponder, from a connected optical transmitter an optical signal having a center frequency;
   generating a frequency adjusted optical signal having a disparate center frequency; and
   providing the frequency adjusted optical signal to a connected filter of the filter array.

17. The method of claim 12, further comprising connecting any one of the transponders to any one of the filters of the filter array using the cross-connect.

18. The method of claim 12, wherein each of the transponders comprises a bit-to-bit transponder operable to provide wavelength conversion for the received optical signal.

19. The method of claim 18, wherein each of the transponders comprises selectable clock sources to match an incoming bit rate of the received optical signal.

20. The method of claim 12, further comprising:
   determine a bandwidth for a channel;
   selecting and connecting an optical transmitter and a filter for the channel; and
   dynamically adjusting the spectrum width of the filter to correspond to the bandwidth of the channel.

21. The method of claim 20, further comprising selecting the optical transmitter based on the bandwidth of the channel.

22. The method of claim 20, further comprising deactivating filters neighboring the filter of the channel that are within the spectrum width of the channel.

23. A system for provisioning a wavelength division multiplexing (WDM) transmitter system, comprising:
   means for connecting to each of a plurality of optical transmitters a respective filter of a filter array comprising a plurality of filters, the filters each having a disparate center frequency and a spectrum width dynamically adjustable to correspond to a bandwidth of an optical signal generated by the associated optical transmitter;
   means for combining into a wavelength division multiplexing (WDM) signal a plurality of the optical signals generated by the optical transmitters and passing through the filters of the filter array;
   means for directly connecting each of a plurality of transponders to an associated optical transmitter and adjusting a center frequency of a received optical signal to generate a frequency adjusted optical signal and to provide the frequency adjusted optical signal to a connected filter of the filter array; and
   means for connecting at least a subset of the transponders to at least a subset of the filters of the filter array using a cross-connect.

* * * * *